US012780019B2

(12) United States Patent
Jung et al.

(10) Patent No.: US 12,780,019 B2
(45) Date of Patent: Nov. 3, 2026

(54) CONTROL BOX FOR CHARGING

(71) Applicants: HYUNDAI MOTOR COMPANY, Seoul (KR); KIA CORPORATION, Seoul (KR); KOREA ELECTRIC TERMINAL CO., LTD., Incheon (KR); THN CORPORATION, Daegu (KR)

(72) Inventors: Yun Jae Jung, Suwon-si (KR); Seung Min Yoo, Hwaseong-si (KR); Byeong Kyu Kim, Gwangmyeong-si (KR); Yun Chan Hwang, Uiwang-si (KR); Jeong Ki Kyeong, Uiwang-si (KR); Jong Hyok Kim, Suwon-si (KR); Tae Hong Yun, Suwon-si (KR); Seong Cheol Hong, Incheon (KR); Wan June Kim, Incheon (KR); Ja Min Kim, Incheon (KR)

(73) Assignees: HYUNDAI MOTOR COMPANY, Seoul (KR); KIA CORPORATION, Seoul (KR); KOREA ELECTRIC TERMINAL CO., LTD., Incheon (KR); THN CORPORATION, Daegu (KR)

( * ) Notice: Subject to any disclaimer, the term of this patent is extended or adjusted under 35 U.S.C. 154(b) by 791 days.

(21) Appl. No.: 18/135,601

(22) Filed: Apr. 17, 2023

(65) Prior Publication Data

US 2024/0181904 A1 Jun. 6, 2024

(30) Foreign Application Priority Data

Dec. 5, 2022 (KR) ........................ 10-2022-0167890

(51) Int. Cl.
*H02J 7/00* (2026.01)
*B60L 53/16* (2019.01)
(Continued)

(52) U.S. Cl.
CPC ............... *B60L 53/16* (2019.02); *B60L 53/62* (2019.02); *B60L 53/18* (2019.02)

(58) Field of Classification Search
None
See application file for complete search history.

(56) References Cited

U.S. PATENT DOCUMENTS

| | | | | |
|---|---|---|---|---|
| 9,634,435 B1 | 4/2017 | Raschilla et al. | |
| 2016/0020555 A1* | 1/2016 | Ohmura ............... | H01R 13/639 439/153 |
| 2019/0372335 A1* | 12/2019 | Kawamoto ............... | B60L 3/00 |

FOREIGN PATENT DOCUMENTS

| | | |
|---|---|---|
| JP | 5879561 B2 | 2/2016 |
| KR | 20160120093 A | 10/2016 |

(Continued)

OTHER PUBLICATIONS

IEC 61851-1 Electric Vehicle Conductive Charging System; International Electrotechnical Commission (IEC); 2017; Relevant Passages—6.2 Charging Modes; 3.1.10 Case A; 3.1.11 Case B; 3.1.12 Case C; 292 pp.

*Primary Examiner* — Arun C Williams
(74) *Attorney, Agent, or Firm* — Lempia Summerfield Katz LLC

(57) ABSTRACT

A control box for charging includes a second connector disposed at a first end of the control box and configured to be coupled to a first connector provided at a first end of a supply cable configured to be connected to an external power source. The control box includes a retainer configured to prevent separation of the first connector when the first connector and the second connector are completely coupled. A top of the control box is open at a position corresponding to the second connector and the retainer is inserted through the open top and moved up and down.

18 Claims, 17 Drawing Sheets

(51) Int. Cl.
*B60L 53/62* (2019.01)
*B60L 53/18* (2019.01)

(56) References Cited

FOREIGN PATENT DOCUMENTS

| | | | |
|---|---|---|---|
| KR | 20170009353 | A | 1/2017 |
| KR | 20180003996 | A | 1/2018 |

* cited by examiner

CONTROL BOX FOR CHARGING

CROSS REFERENCE TO RELATED APPLICATION

The present application claims priority to Korean Patent Application No. 10-2022-0167890, filed Dec. 5, 2022, the entire contents of which are incorporated herein for all purposes by this reference.

BACKGROUND

Field of the Disclosure

The present disclosure relates to a control box for charging that monitors and controls the SOC (State of Charge) when the battery of an electrified vehicle is charged and that has a structure that can be coupled to and separated from a supply cable connected at a first end to an external power source.

Description of the Related Art

Since an electrified vehicle uses a battery in the vehicle as a main power source, it is required to secure power from the battery. The battery can be charged with electrical energy generated in the vehicle or electrical energy provided by an external power source.

When power from a battery is secured by electrical energy of an external power source, different types of charging methods can be applied to an electrified vehicle, depending on the kind of external power source providing electrical energy. For example, it is possible to charge a battery by connecting an electrified vehicle to a system power source for home or industrial use or a charging facility (Electric Vehicle Supply Equipment (EVSE), and the like). There is a difference in that power is always supplied from a system power source when only a plug is connected to a socket, but a control signal related to charging is not directly provided, whereas power is supplied from a charging facility through an exchange of control signals.

Accordingly, electrified vehicles should be equipped with a charging cable suitable for a charging environment to charge a battery due to these different charging types. For example, charging cables that are used to charge a battery through a system power source may include an In-Cable Control Box (ICCB) that monitors and controls an SOC. Meanwhile, charging cables that are used to charge a battery through a charging facility may have a plug configured to be connected to an external power source and a plug configured to be connected to a vehicle at both ends, respectively.

In order to use both of the different charging types described above when charging a battery, users of electrified vehicles need a plurality of charging cables corresponding to the types, respectively, which results in an economic burden. In order to solve this problem, recently, a separation type charger including charging cables is used. The charging cables can be coupled to and separated from both ends of an ICCB, respectively, and are connected to an external power source and a vehicle, and are able to be separated and replaced, depending on charging environments.

Since the structure that separates charging cables and an ICCB is applied, problems due to the connection between charging cables and an ICCB may be generated. For example, when an ICCB determines that a charging cable has been completely connected, and charging is performed even though the charging cable is not completely coupled to the ICCB, there is a problem that heat is generated at the joint of the charging cable and the ICCB. Further, when an external force is applied to a charging cable while an electrified vehicle is charged, the charging cable and an ICCB may be forcibly disconnected, which may cause a problem that charging is not performed well or the joint of the ICCB is damaged. Further, since the charging cable and the ICCB are forcibly disconnected, there is a possibility that a user may receive an electric shock through the charging cable keeping connected to an external power source.

The description provided above as a related art of the present disclosure is just to aid in understand the background of the present disclosure and should not be construed as being included in the related art known by those having ordinary skill in the art.

SUMMARY

The present disclosure has been made in an effort to solve these problems. An objective of the present disclosure is to provide a control box for charging that monitors and controls the state of charge (SOC) when a battery of an electrified vehicle is charged. Another objective is to provide a control box for charging that has a structure, which can be coupled to and separated from a supply cable connected at a first end to an external power source. Another objective is to provide a control box for charging that can increase a coupling force to the supply cable.

The technical subjects to implement in the present disclosure are not limited to the technical problems described above. Other technical subjects that are not stated herein should be clearly understood by those having ordinary skill in the art from the following specifications.

In order to achieve the objectives described above, a control box for charging according to the present disclosure includes: a first connector provided at a first end of a supply cable configured to be connected to an external power source; a second connector disposed at a first end of the control box for charging and configured to be coupled to the first connector; and a controller configured to monitor or control a SOC in a vehicle, depending on whether the first connector and the second connector are completely coupled. The second connector includes a plurality of terminals in which a plurality of connection pins provided at the first connector are inserted, respectively, and at least some of which are different in length. The controller determines whether the first connector and the second connector are completely coupled based on whether the terminals, at least some of which are different in length, and the plurality of connection pins are in contact with each other.

For example, an output cable configured to provide power from the external power source to the vehicle may be always connected to a second end of the control box for charging.

For example, the plurality of terminals may include an AC terminal to which AC power is input and a signal terminal configured to transmit a power input signal or a communication signal. A protruding length of the AC terminal may be longer than a protruding length of the signal terminal.

For example, the controller may determine complete coupling only when the AC terminal and the signal terminal are all in contact with the plurality of connection pins.

For example, the controller may determine whether the AC terminal and the signal terminal are all in contact with the plurality of connection pins based on voltages at the AC terminal and the signal terminals.

For example, the controller may determine an incomplete coupling state and output determination information when the first connector and the second connector are not completely coupled.

Further, in order to achieve the objectives described above, a control box for charging according to the present disclosure includes: a first connector provided at a first end of a supply cable configured to be connected to an external power source; a second connector disposed at a first end of the control box for charging and configured to be coupled to the first connector; and a retainer configured to prevent separation of the first connector when the first connector and the second connector are completely coupled. A top of the control box for charging is open at a position corresponding to the second connector and the retainer is inserted through the open top and moved up and down.

For example, the control box for charging may further include a stopper configured to prevent up-down, i.e., vertical movement of the retainer when the first connector and the second connector are completely coupled.

For example, the stopper may have a spring therein and may be moved forward by the spring and coupled to the retainer when the first connector and the second connector are completely coupled, thereby preventing up-down, i.e., vertical movement of the retainer.

For example, the retainer may include: a cover configured to cover the open top when the first connector and the second connector are completely coupled; and legs extending downward from the ends of both sides of the cover and having respective guide holes in which the first connector is moved and fixed when the first connector and the second connector are coupled.

For example, the cover may have an internal space open rearward. A stopper configured to prevent up-down, i.e., vertical movement of the retainer may be inserted in the internal space when the first connector and the second connector are completely coupled.

For example, the second connector may further include holders configured to fix the position of the retainer by being inserted in the guide holes when the first connector is not coupled to the second connector.

For example, the holders may be formed to be spaced apart from the sides of the second connector. The legs may be positioned between the holders and the sides of the second connector.

For example, protrusions may be formed on an outer surface of the first connector. The protrusions may release the retainer by moving outward the holders inserted in the guide holes and may be inserted in and moved through the guide holes.

For example, the holders moved outward may be inserted in fixing grooves formed at the legs of the retainer when the protrusions finish being moved and the first connector and the second connector are completely coupled, thereby fixing the retainer.

For example, protrusions may be formed on an outer surface of the first connector and may be inserted in and moved through the guide holes divided into a plurality of sections. The first connector and the second connector may thereby be completely coupled.

For example, the first connector may be primarily coupled to the second connector when the protrusions are moved rearward through a first section of the plurality of sections of the guide holes and may be completely coupled to the second connector when the protrusions are moved rearward through a second section of the plurality of sections.

For example, when the protrusions reach a rear end of the first section, the retainer may be moved down so that the protrusions are positioned in a second section of the plurality of sections. When the protrusions reach a rear end of the second section, the retainer may be moved down so that that the protrusions are positioned in a third section of the plurality of sections. The retainer may restrict forward-rearward movement of the protrusions in the third section, thereby preventing separation of the first connector.

According to the control box for charging of the present disclosure, charging is allowed only when the first connector and the second connector are completely coupled. It is thereby possible to prevent heat from being generated when the first connector and the second connector are incompletely coupled.

Further, since the retainer can maintain a coupling state when the first connector and the second connector are coupled, it is possible to prevent the first connector and the second connector from being forcibly decoupled by an external force and it is possible to improve safety for a user in charging.

The effects of the present disclosure are not limited to the effects described above. Other effects should be more clearly understood by those having ordinary skill in the art from the following description.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
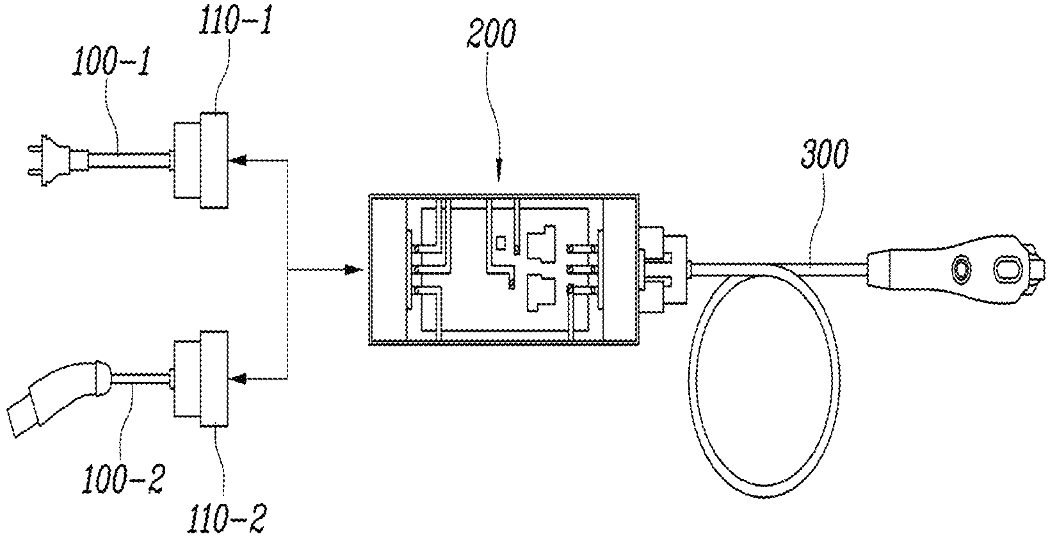
FIG. 1 is a view showing a configuration of a separation type charger having a control box for charging according to an embodiment of the present disclosure.

In the following description, where the detailed description of known technologies related to the present disclosure would make the subject matter of the embodiments described herein unclear, the detailed description thereof has been omitted. Further, the accompanying drawings are provided only to aid in understanding embodiments disclosed in the specification. The technical spirit disclosed in the specification is not limited by the accompanying drawings. All changes, equivalents, and replacements should be understood as being included in the spirit and scope of the present disclosure.

Terms including ordinal numbers such as "first," "second," and the like may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween.

Singular forms are intended to include plural forms unless the context clearly indicates otherwise. When a component, device, element, or the like, of the present disclosure, is described as having a purpose or performing an operation, function, or the like, the component, device, or element should be considered herein as being "configured to" meet that purpose or to perform that operation or function.

It should be further understood that the terms "comprises" or "have" and variations thereof used in this specification specify the presence of stated features, steps, operations, components, parts, or a combination thereof. Such terms do not preclude the presence or addition of one or more other features, numerals, steps, operations, components, parts, or a combination thereof.

Hereafter, embodiments of the present disclosure are described in detail with reference to the accompanying drawings. The same or similar components are given the same reference numerals throughout the drawing figures and are not repeatedly described.

A unit or a control unit that is included in names such as a micro control unit (MCU) is only a term that is generally used to name a controller that controls specific functions of a vehicle rather than to mean a generic function unit. For example, each control unit may include a communication device that communicates with another control unit or a sensor to control corresponding functions, a memory that stores an operating system or logic commands and input/output information, and one or more processors that perform determination, calculation, decision, and the like for controlling the corresponding functions.

A separation type charger having a control box for charging according to an embodiment is described first.

FIG. 1 is a view showing the configuration of a separation type charger having a control box for charging according to an embodiment of the present disclosure.

Referring to FIG. 1, a separation type charger according to an embodiment may include a supply cable 100 that is connected to an external power source and supplies external power. The separation type charger may also include a control box for charging 200 that is connected at a first end to the supply cable 100 and monitors or controls the SOC in a vehicle when the vehicle is charged with power supplied from the outside. The separation type charger may also include an output cable 300 that is connected to a second end of the control box for charging 200 and provides power supplied from the outside to the vehicle.

The supply cable 100 includes a plurality of supply cables having different plugs, depending on external power sources. For example, the supply cable 100 may include a supply cable 100-1 having a plug that is connected to an external power source for home or commercial use and a supply cable 100-2 having a plug that is connected to a charging facility. A first connector 110 may be disposed at a first end of the supply cable 100 and first connectors 110-1 and 110-2 having the same shapes may be disposed at respective first ends of a plurality of supply cables 100-1 and 100-2 having different plugs.

The control box for charging 200 may have, at the first end, a second connector 210 that is coupled to the first connector 110 when the control box for charging 200 is connected with the supply cable 100. The control box for charging 200 is connected to the supply cable 100 and can monitor or control the SOC in a vehicle that depends on power that is input from the outside. In particular, when the supply cable 100-1 having a plug that is connected with an external power source for home or commercial use is connected, there is a need for a device that can adjust and control external power that is input through the supply able 100-1, and the control box for charging 200 can perform the function. For example, the control box for charging 200 can be provided with information about whether a vehicle can be charged and the amount of power for charging the vehicle through communication with the vehicle and can control external power to be transmitted to the vehicle based on the information. The control box for charging 200 may have a separate display (not shown) and may visually output information about an SOC. To this end, the control box for charging 200 according to an embodiment of the present disclosure may be implemented as an In-Cable Control Box (ICCB).

However, when the control box for charging 200 is connected with the supply cable 100-2, which has a plug that is connected with a charging facility, external power that is input can be adjusted and charging can be generally controlled by checking the state of a vehicle using the charging facility. In this case, the control box for charging 200 may be disposed between the supply cable 100-2 and the vehicle and may function as a path for transmitting/receiving control signals.

Accordingly, since the second connector 210 is disposed at the first end of the control box for charging 200, the control box for charging 200 can be coupled to and separated from the plurality of supply cables 100-1 and 100-2 having the first connectors 110-1 and 110-2 when a vehicle is charged, depending on external power sources, whereby it is possible to cope with a plurality of external power sources using one charger. However, heat may be generated at the second connector 210 due to incomplete coupling between the first connector 110 and the second connector 210. A configuration for solving this problem is described below with reference to FIG. 2.

Meanwhile, the output cable 300 is connected to the second end of the control box for charging 200 and is configured to be connected to a vehicle, thereby being able to transmit external power input through the supply cable 100 to the vehicle. The output cable 300 may be always connected to the control box for charging 200, depending on the configuration of the separation type charger. However, this is only an example and connection of the output cable 300 is not limited to that described above. For example, similar to the supply cable 100, the output cable 300 may have a connector at a first end to be separably connected to the second end of the control box for charging 200.

Hereafter, the control box for charging 200, which determines whether the first connector 110 and the second connector 210 according to an embodiment of the present disclosure have been completely coupled, is described.

Figure 2:
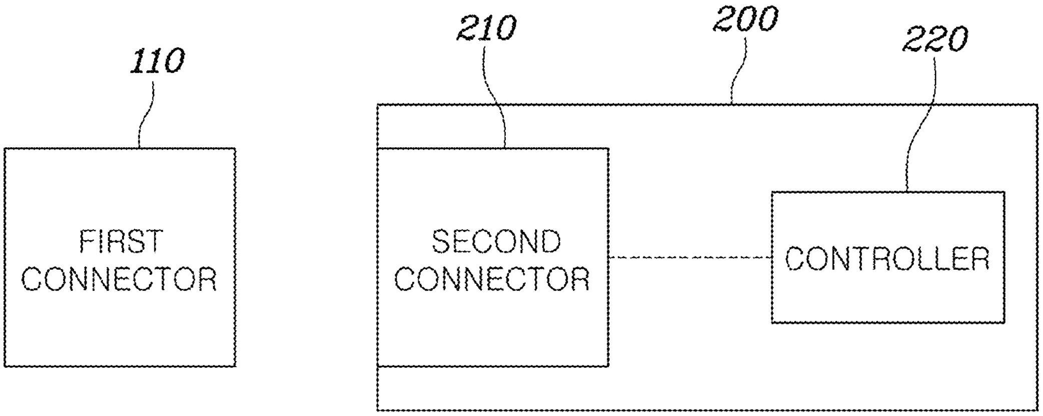
FIG. 2 is a block diagram showing a configuration of a control box for charging that determines whether a first connector and a second connector according to an embodiment of the present disclosure have been completely coupled.

FIG. 2 is a block diagram showing the configuration of a control box for charging that determines whether a first connector and a second connector according to an embodiment of the present disclosure have been completely coupled.

Referring to FIG. 2, the control box for charging 200 may further include a controller 220 that monitors or controls the SOC in a vehicle, depending on whether the first connector 110 and the second connector 210 have been completely coupled when the first connector 110 and the second connector 210 are coupled. FIG. 2 mainly shows components related to an embodiment of the present disclosure, and of course, fewer or more components may actually be included to implement a control box for charging 200.

In detail, the first connector 110 may have a plurality of connection pins 111 and the second connector 210 may have a plurality of terminals in which the connection pins 111 are inserted, respectively, at least some of which are different in length. The controller 220 can determine whether the connectors have been completely coupled based on whether the terminals at least some of which are different in length and the connection pins 111 are in contact with each other. This is described with reference to FIGS. 3-5.

Meanwhile, when the controller 220 is implemented, the controller 220 may be implemented as a function of a Micro Controller Unit (MCU) disposed in the control box 200 for charging. However, this is an example and the present disclosure is not necessarily limited thereto. For example, the controller 220 may be implemented as a controller separate from the MCU.

Figure 3:
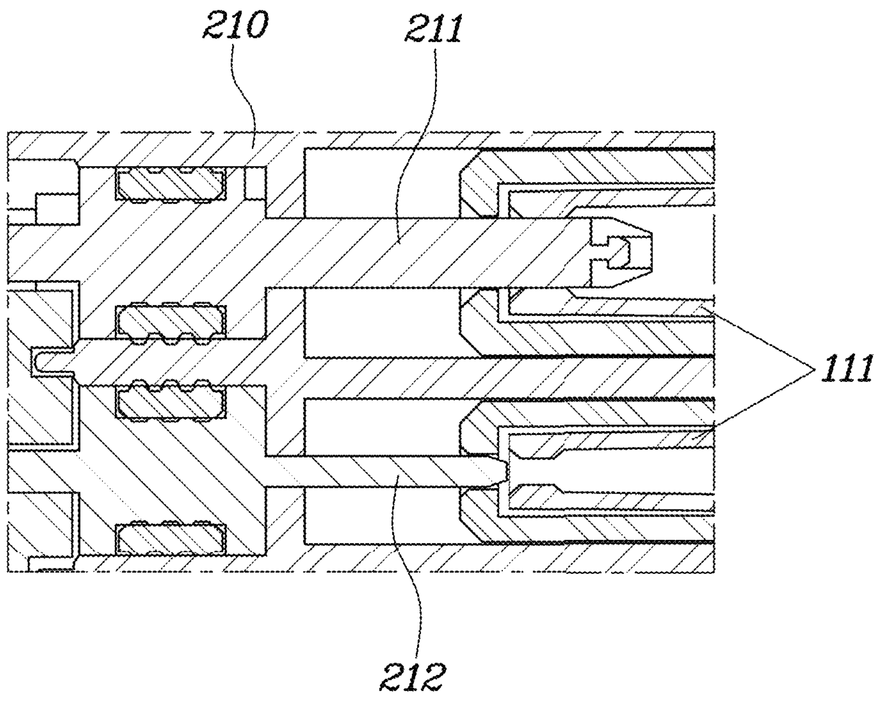
FIGS. 3 and 4 are views illustrating whether the first connector and the second connector according to an embodiment of the present disclosure have been coupled.
Figure 4:
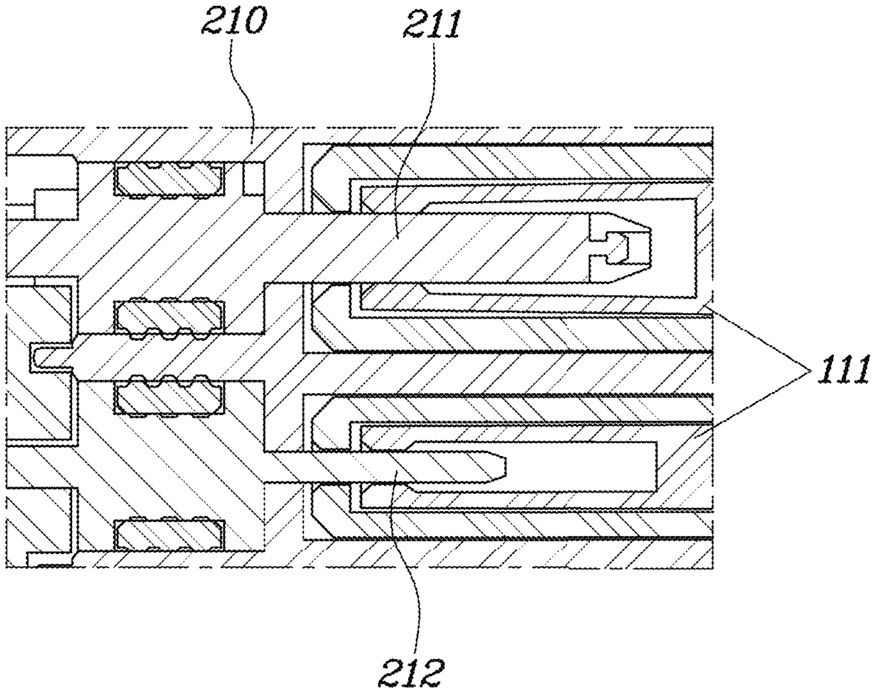

FIGS. 3 and 4 are views illustrating whether the first connector and the second connector according to an embodiment of the present disclosure have been coupled.

Before describing FIGS. 3 and 4, the second connector 210 shown in FIGS. 3 and 4 has a single AC terminal 211 and a single signal terminal 212, but this is for the convenience of description. The AC terminal 211 and the signal terminal 212 each may be composed of a plurality of terminals having the same property.

Referring to FIGS. 3 and 4, a plurality of terminals may include an AC terminal 211 to which AC power is input, and a signal terminal 212, which transmits a power input signal or a communication signal. The protruding length of the AC terminal 211 may be longer than the protruding length of the signal terminal 212. The second connector 210 of the control box for charging 200 may have an interlock structure for determining whether the second connector 210 has been completely coupled to the first connector 110.

Referring to FIG. 3, the first connector 110 inserted in the second connector 210 is shown. The connection pins 111 formed at the first connector 110 all may have the same length. When the first connector 110 is coupled to the second connector 210, the AC terminal 211 formed at the second connector 210 may first come in contact with the connection pins 111 of the first connector 110. However, since the protruding lengths of the AC terminal 211 and the signal terminal 212 are different, the signal terminal 212 may not come in contact with the connection pins 11 when the connectors are incompletely coupled. Accordingly, when the first connector 110 and the second connector 210 are coupled and when AC power can be input through the AC terminal 211 but an input signal or a communication signal is not transmitted through the signal terminal 212, an incomplete coupling state can be sensed.

Referring to FIG. 4, the connection pins 111 of the first connector 110 are completely inserted in the second connector 210, whereby all of the connection pins 111 can be brought in contact with both the AC terminal 211 and the signal terminal 212. Since the connection pins 111 are in contact with the terminals 211 and 212 of the connectors 210, the first connector 110 and the second connector 210 can be sensed as being in a complete coupling state.

Meanwhile, when the connection pins 111 and the terminals 211 and 212 are connected, a current flows, so a voltage can be generated. The controller 220 can sense whether the first connector 110 and the second connector 210 have been completely coupled based on the voltage generated at the AC terminal 211 and the signal terminal 212. This is described with reference to FIG. 5.

Figure 5:
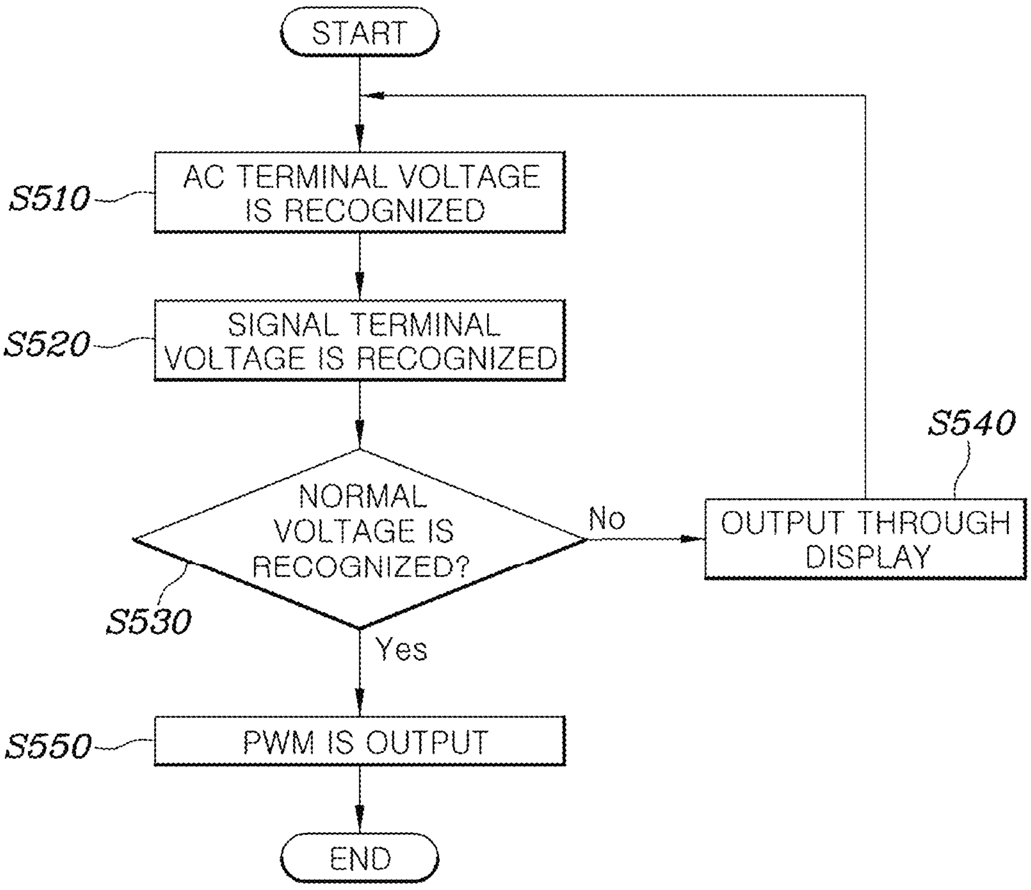
FIG. 5 is a flowchart showing a process of determining whether the first connector and the second connector have been completely coupled using a controller of the control box for charging according to an embodiment of the present disclosure.

FIG. 5 is a flowchart showing a process of determining whether the first connector and the second connector have been completely coupled using a controller of the control box for charging according to an embodiment of the present disclosure.

Referring to FIG. 5, the controller 220 can recognize the voltage at the AC terminal 211 of the second connector 210 when the first connector 110 and the second connector 210 are coupled (S510). In this case, since the AC terminal 211 first comes in contact with the connection pins 111 of the first connector 110, power may be applied to the controller 220 and the powered controller 220 may recognize the voltage at the AC terminal 211.

When the voltage at the AC terminal 211 is recognized, the controller 220 can recognize the voltage at the signal terminal 212 (S520). Further, the controller 220 can determine whether the voltage recognized at the signal terminal 212 is a normal voltage (S530). When the first connector 110 and the second connector 210 are coupled and the connection pins 111 and the signal terminal 212 come in contact with each other, a normal voltage can be recognized at the signal terminal 212. Also, whether the connection pins 111 and the signal terminal 212 are in contact with each other can be determined based on the recognized normal voltage value. For example, in the present disclosure, the normal voltage that is recognized at the signal terminal 212 may have a voltage value of 1V~4V, as an embodiment. When the voltage recognized at the signal terminal 212 is not normal, it may mean that the signal terminal 212 and the connection pins 111 are not in a complete contact state.

Accordingly, when the controller 220 recognizes the voltage at the signal terminal 212 and the voltage recognized at the signal terminal 212 is not a normal voltage (No, in S530), the controller 220 can determine that the first connector 110 and the second connector 210 are in an incomplete coupling state. The controller 220 can output information about the determination of an incomplete coupling state through the display (not shown) of the control box 200 for charging (S540). However, this is only an example and, of course, an output device that outputs the information about the determination of an incomplete coupling state of the first connector 110 and the second connector 210 is not limited to that described above. For example, the output device that outputs information about determination may be not only a display but may be an audio device that outputs a voice or sound.

A user can correct the coupling state of the first connector 110 and the second connector 210 based on the information about an incomplete coupling state output through the display in order to completely couple the first connector 110 and the second connector 210.

When the voltage recognized at the signal terminal 212 is a normal voltage (yes in S530), the controller 220 can determine that the first connector 110 and the second connector 210 are in a complete coupling state and can output a Pulse Width Modulation (PWM) signal for normal operation (S550).

Since, as described above, an interlock structure is formed such that some of the terminals of the second connector are different in length, the controller 220 can perform control such that charging is not performed when the first connector 110 and the second connector 210 are in an incomplete coupling state. The controller 220 can perform control such that charging is performed when the first connector 110 and the second connector 210 are in a complete coupling state. Accordingly, it is possible to prevent heat generation at the second connector 210 due to an incomplete coupling of the first connector 110, and the second connector 210.

Meanwhile, since the supply cable 100 and the control box for charging 200 are configured in a separable structure, when an external force is applied, the joint between the supply cable 100 and the control box for charging 200 may be separated, i.e., the first connector 110 and the second connector 210 may be forcibly decoupled. For this situation, the control box 200 for charging according to an embodiment of the present disclosure includes a retainer 230, which prevents separation of the first connector 110 due to an external force when the first connector 110 and the second connector 210 are completely coupled. This is described with reference to FIGS. 6-17.

First, a configuration of the control box for charging 200 that can maintain the coupling state of the first connector 110 and the second connector 210 according to an embodiment of the present disclosure is described.

Figure 6:
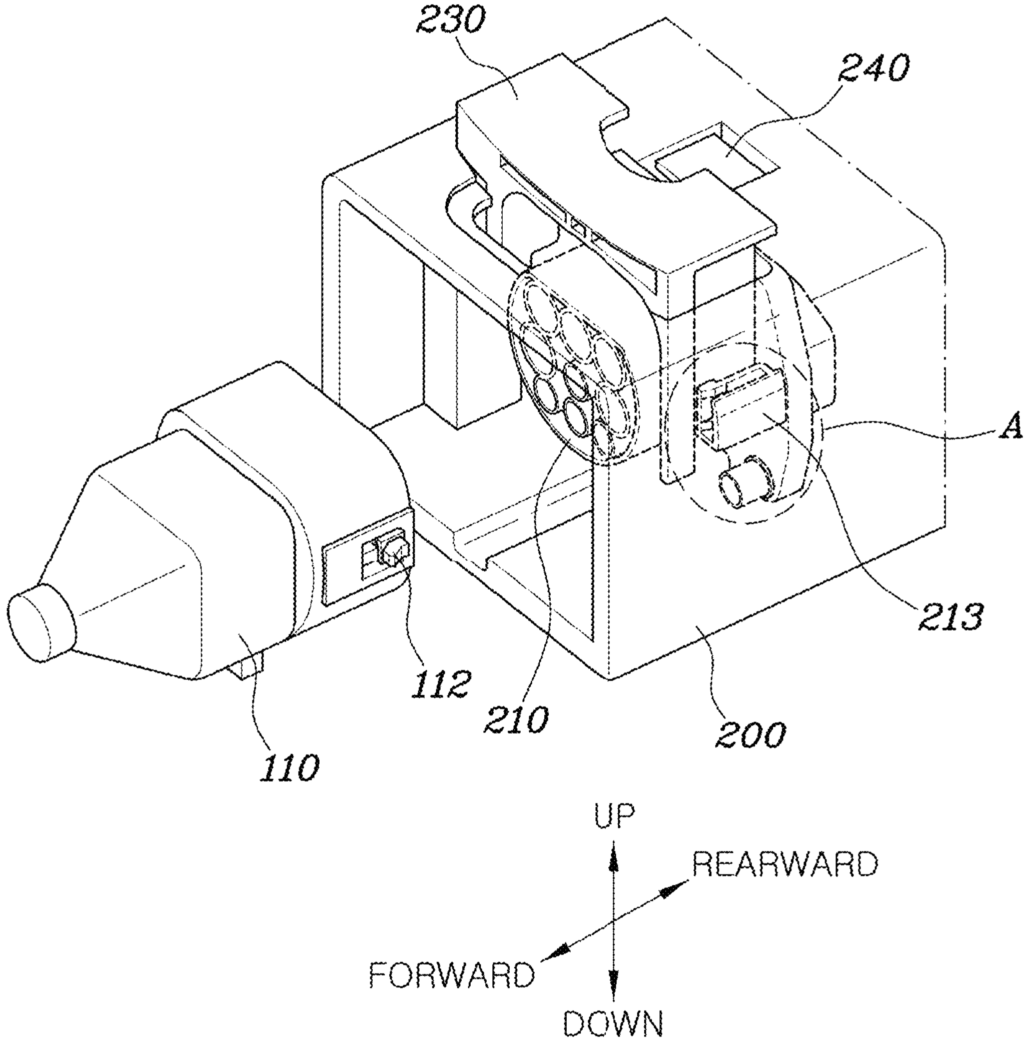
FIGS. 6 and 7 are views showing a configuration of the control box for charging that maintains the coupling state of the first connector and the second connector according to an embodiment of the present disclosure.
Figure 7:
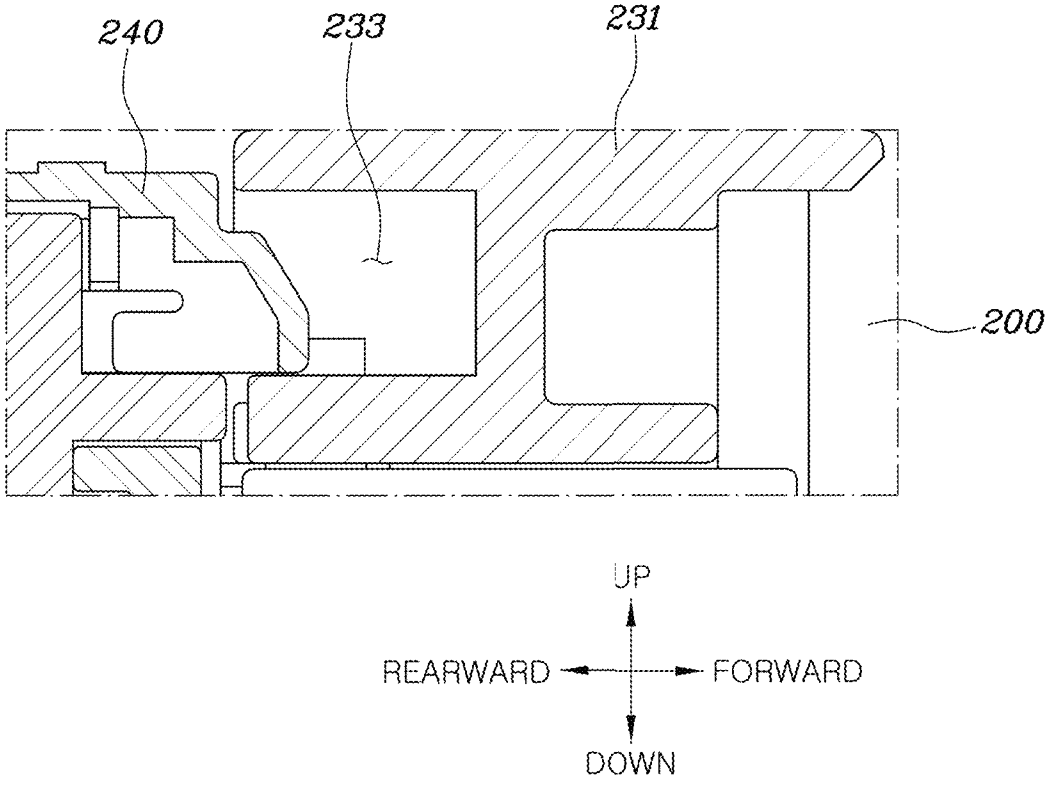

FIGS. 6 and 7 are views showing a configuration of the control box for charging that maintains the coupling state of the first connector and the second connector according to an embodiment of the present disclosure.

Referring to FIG. 6, since the second connector 210 is disposed at the first end of the control box for charging 200, the first connector 110 and the second connector 210 can be coupled at the first end of the control box for charging 200. The control box for charging 200 may further have a retainer 230 that prevents separation of the first connector 110 when the first connector 110 and the second connector 210 are completely coupled. In particular, the top of the control box for charging 200 is open at a position corresponding to the second connector 210. The retainer 230 can be inserted and moved up and down through the open top.

The retainer 230 may be composed of a cover 231 that covers the open top when the first connector 110 and the second connector 210 are completely coupled, and legs 232 extending downward from the ends of both sides of the cover 231, respectively. Further, when the retainer 230 is inserted into the control box for charging 200, separation of the first connector 110 can be prevented by the legs 232 formed on both sides of the cover 231 when the first connector 110 and the second connector 210 are completely coupled. This is described below.

Further, a dual locking structure may be formed such that the retainer 230 is completely inserted in the control box for charging 200 and is not moved up and down when the first connector 110 and the second connector 210 are completely coupled. To this end, the control box for charging 200 may further have a stopper 240 that prevents the retainer 230 from moving up and down when the first connector 110 and the second connector 210 are completely coupled. The function of the stopper 240 is described with reference to FIG. 7.

FIG. 7 is a cross-sectional view showing the part at which the retainer 230 of the control box for charging 200 according to an embodiment of the present disclosure is formed.

The stopper 240 according to an embodiment of the present disclosure has a spring therein and is moved forward and coupled to the retainer 230 by the spring when the first connector 110 and the second connector 210 are completely coupled, thereby being able to prevent the retainer 230 from moving up and down. In detail, an internal space 233 may be formed at the cover 231 of the retainer 230 and the stopper 240 can be inserted into the internal space 233 formed at the cover 231. When the first connector 110 and the second connector 210 are not completely coupled, the retainer 230 may be partially exposed out of the control box for charging 200 without being completely inserted in the control box for charging 200. In this case, movement in a front-rear direction of the stopper 240 can be restricted due to the cover 231 of the retainer 230 and the internal space 233 formed at the cover 231. The stopper 240 can remain not coupled to the retainer 230.

When the first connector 110 and the second connector 210 are completely coupled, the retainer 230 is completely inserted in the control box for charging 200. Thus, the internal space 233 formed at the cover 231 and the stopper 240 are positioned on the same line and the stopper 240 is released. Accordingly, the stopper can be moved in the front-rear direction and inserted into the internal space 233 by compression force of the spring 240. Depending on embodiments, the stopper 240 may be completely inserted in the internal space 233 to restrict up-down, i.e., vertical movement of the retainer 230 and may be only partially inserted in the internal space 233 to also restrict up-down, i.e., vertical movement of the retainer 230.

Meanwhile, referring to FIG. 6 again, the retainer 230 can be moved up and down through the open top and guide holes 234 in which the first connector 110 is moved and fixed when the first connector 110 and the second connector 210 are coupled may be formed at the legs 232 of the retainer 230. The retainer 230 is moved up and down in accordance with the shape of the guide holes 234, but the up-down movement range may be limited.

Since the first connector 110 is moved and fixed in the guide holes 234, it is possible to seat the first connector 110 in the guide holes 234 formed at the legs 232 of the retainer 230 by fixing the position of the retainer 230 before the first connector 110 and the second connector 210 are coupled. To this end, the second connector 210 may further have holders 213 that fix the position of the retainer 230 when the first connector 110 and the second connector 210 are not coupled. The holders 213 may be formed to be spaced apart from the sides of the second connector 210 and the retainer 230 may be inserted such that the legs 232 of the retainer 230 are positioned between the holders 213 and the sides of the second connector 210.

The holders 213 can fix the position of the retainer 230 by being inserted in the guide holes 234 of the legs 232, which may be performed in part A shown in FIG. 6. This is described with reference to FIGS. 8 and 9.

Figure 8:
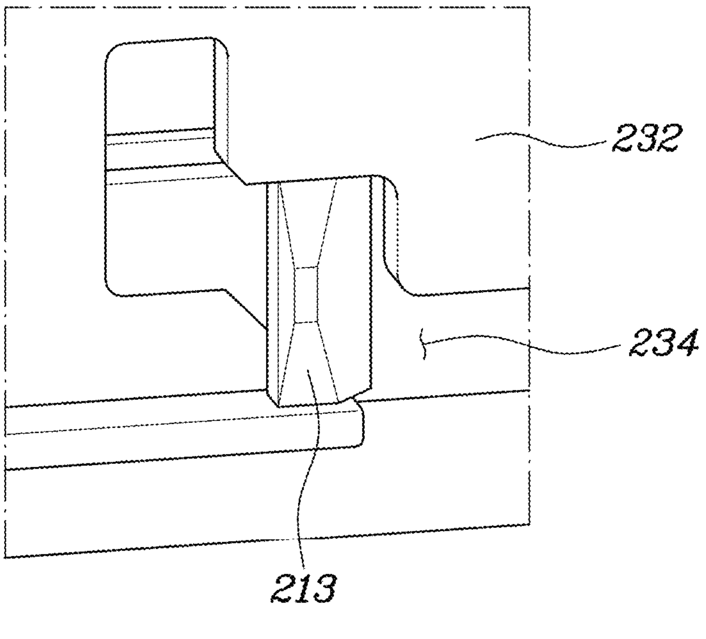
FIGS. 8 and 9 are enlarged views of part A shown in FIG. 6 according to an embodiment of the present disclosure.
Figure 9:
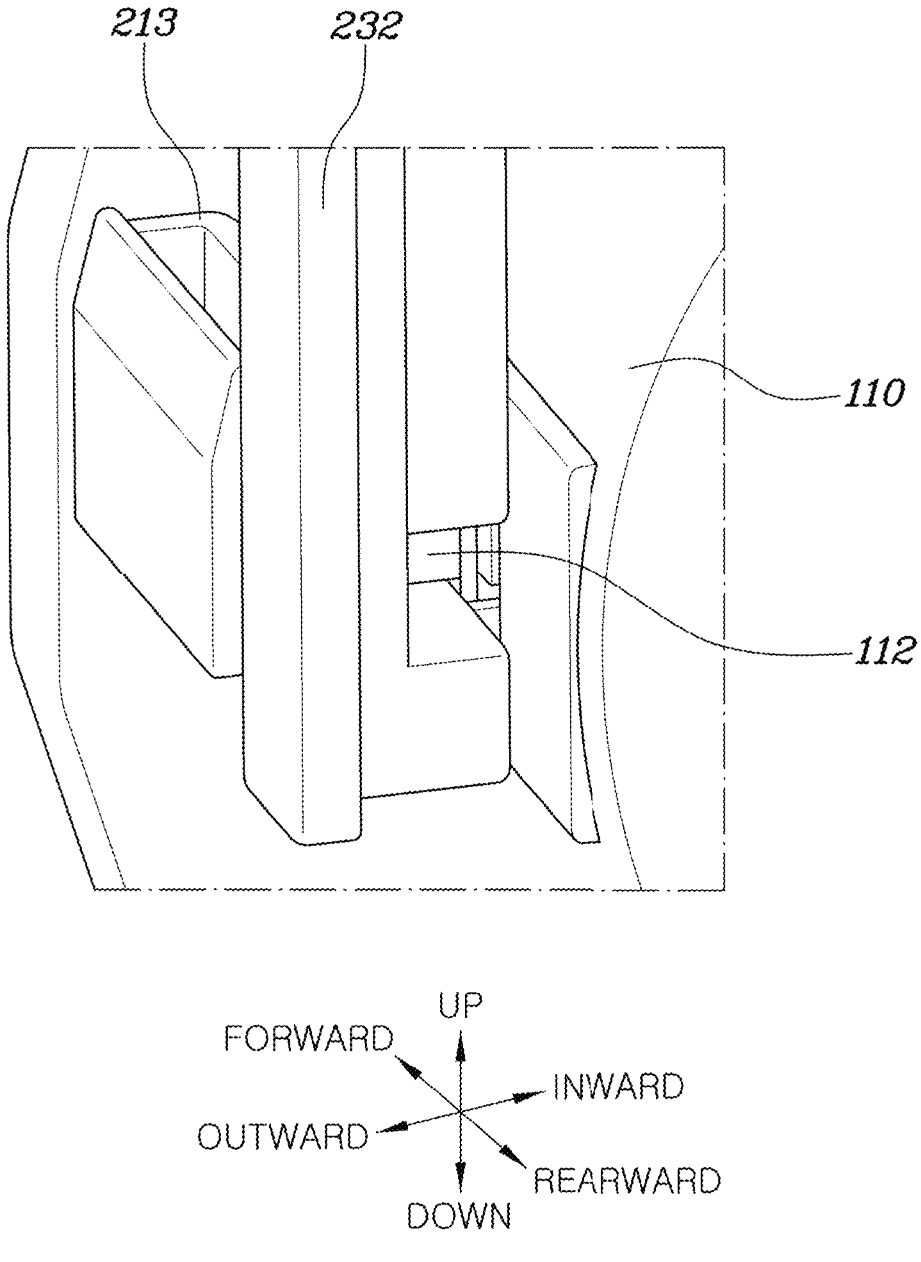

FIGS. 8 and 9 are enlarged views of part A shown in FIG. 6 according to an embodiment of the present disclosure.

First, fixing the position of the retainer 230 using the holders 213 is described with reference to FIG. 8. A projection is formed at an end of the holder 213, so when the projections are inserted in the guide holes 234 formed at the legs 232 of the retainer 230, movement of the retainer 230 can be restricted before the first connector 110 and the second connector 210 are coupled. The shape of the projection formed at the holder 213 shown in FIG. 8 is an example and, of course, the holder 213 is not limited to the shape shown in the figure. For example, any shape can be applied as long as the projection can be inserted in the guide hole 234 formed at the leg 232 and can retain movement of the retainer 230.

Hereafter, a process in which the retainer 230 of which the position is fixed is released by the first connector 110 when the first connector 110 and the second connector 210 are coupled is described with reference to FIG. 9. Referring to FIG. 9, protrusions 112 may be formed on the outer surface of the first connector 110 and the retainer 230 of which the position is fixed is released by the protrusions 112 when the first connector 110 and the second connector 210 are coupled.

In detail, when the first connector 110 is moved rearward to be coupled to the second connector 210, the protrusions 112 formed on the outer surface of the first connector 110 can be moved rearward through the guide holes 234. The protrusions 112 can push outward the holders 213 inserted in the guide holes 234 while moving rearward through the guide holes 234. As the protrusions 112 move outward the holders 213, the holders 213 can be withdrawn, i.e., separated from the guide holes 234, whereby the protrusions 112 can be moved through the guide holes 234. Further, since the holders 213 are separated from the guide holes 234, the retainer 230, of which the up-down, i.e., vertical movement is restricted, can be released.

Hereafter, the protrusions 112 that are moved through the guide holes 234 when the first connector 110 and the second connector 210 are coupled are described with reference to FIGS. 10-16.

FIGS. 10-16 are views illustrating a process of coupling the first connector and the second connector according to an embodiment of the present disclosure.

Referring to FIGS. 10-16, the first connector 110 is moved rearward and inserted into the second connector 210, whereby the first connector 110 and the second connector 210 can be coupled. Movement of the first connector 110 may be performed step by step through the guide holes 234 formed at the legs 232 of the retainer 230.

Figure 10:
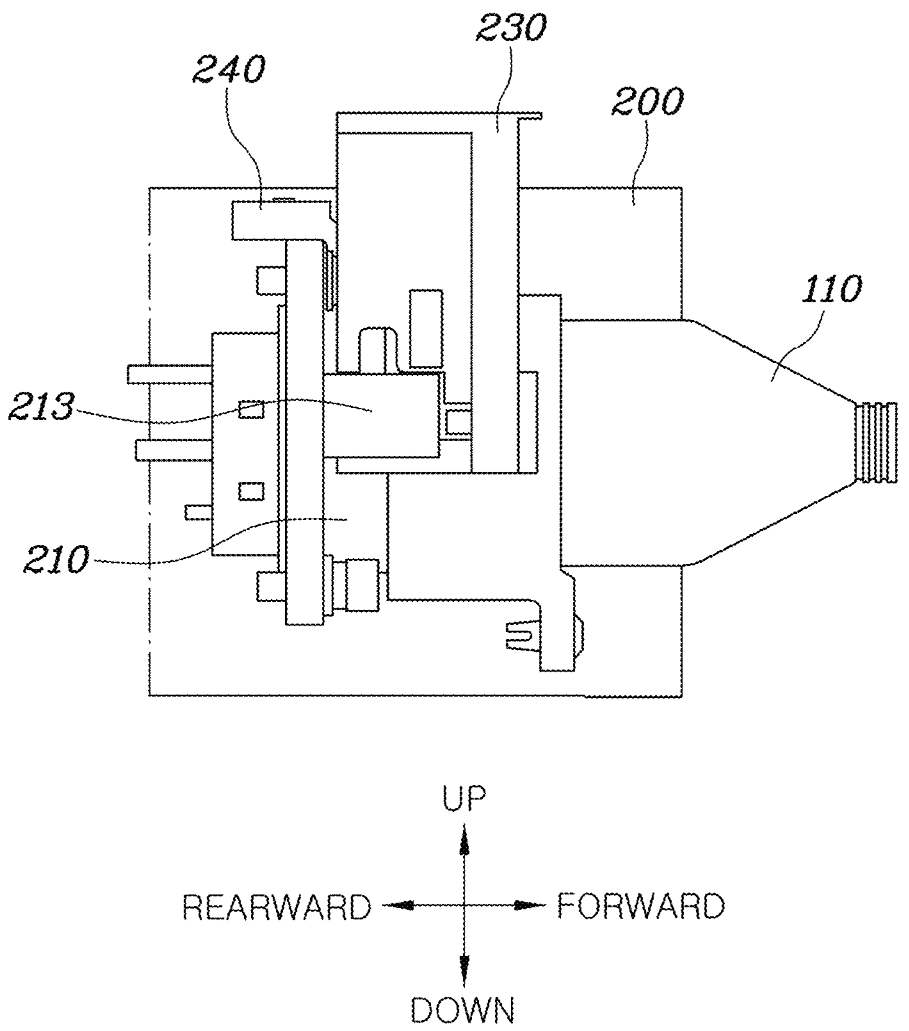
FIGS. 10-16 are views illustrating a process of coupling the first connector and the second connector according to an embodiment of the present disclosure.

Referring to FIG. 10, the first connector 110 and the second connector 210 are not completely coupled and the retainer 230 is not completely inserted in the control box for charging 200. Thus, the stopper 240 may also not be inserted in the retainer 230.

Figure 11:
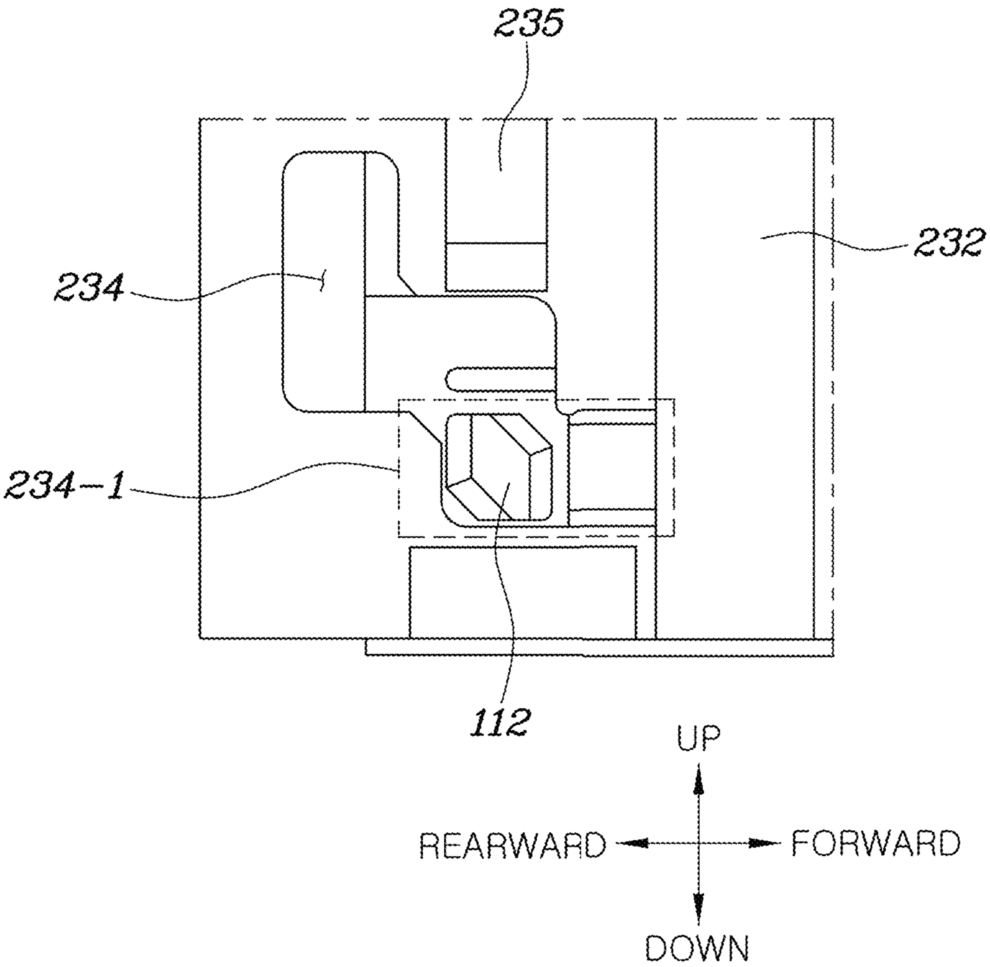

Referring to FIG. 11, when the first connector 110 and the second connector 210 are coupled, the protrusions 112 formed on the first connector 110 can be inserted into the guide holes 234 formed at the legs 232 of the retainer 230 and can be moved rearward through the guide holes 234. The guide holes 234 may be divided into a plurality of sections due to the shape of the guide holes 234 and the first connector 110 can be coupled to the second connector 210 while being moved by movement of the protrusions 112 in the sections. The guide hole 234 according to an embodiment may be divided into three sections in the present disclosure. However, this is only an example and, of course, the guide hole 234 may be divided into fewer or more sections, depending on the shape thereof.

Referring to FIG. 11, when the first connector 110 and the second connector 210 start to be coupled, the protrusion 112 can be moved rearward through a first section 234-1 of the guide hole 234. As the protrusion 112 is moved rearward through the first section 234-1, the first connector 110 can be primarily coupled to the second connector 210.

Figure 12:
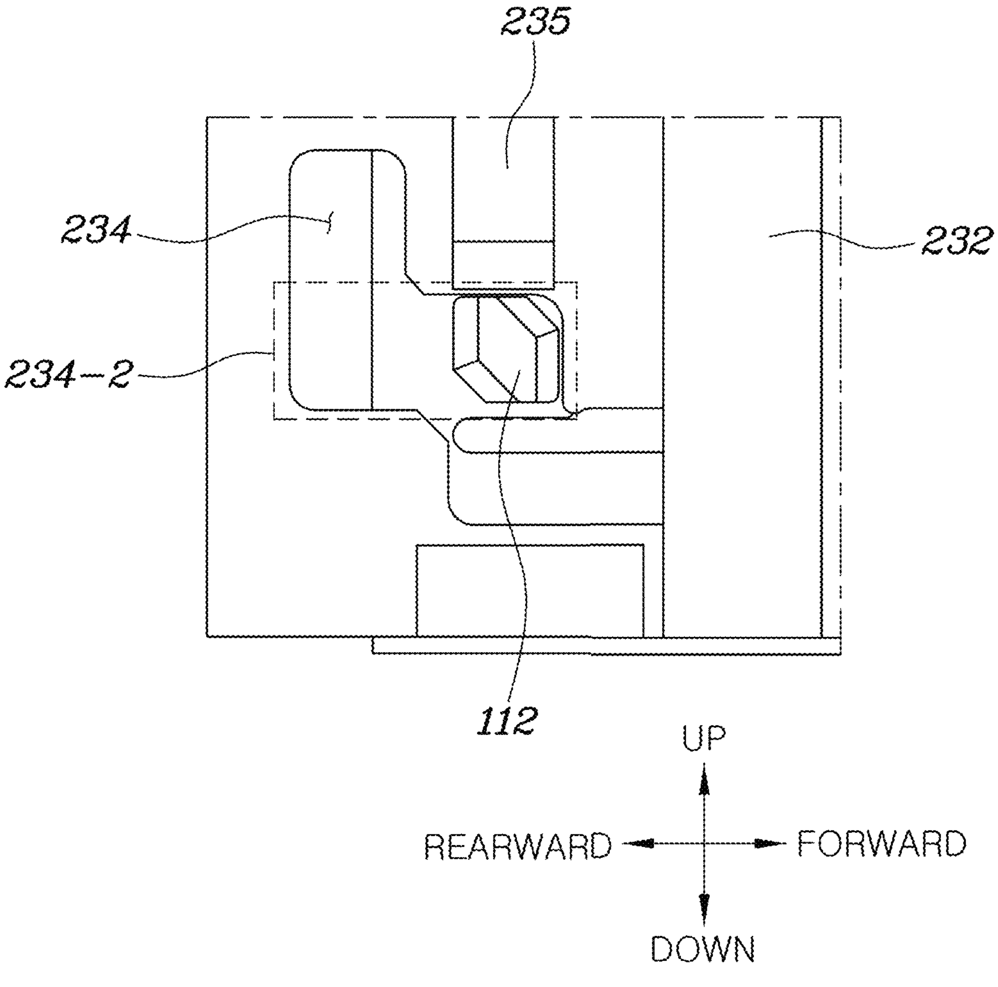

When the protrusion 112 reaches the end of the first section 234-1, the first connector 110 is no longer moved rearward, but it is possible to further move the first connector 110 rearward using the retainer 230. Referring to FIG. 12, when the protrusion 112 reaches the end of the first section 234-1, it is possible to position the protrusion 112 in a second section 234-2 of the sections of the guide hole 234 by moving down the retainer 230.

Figure 13:
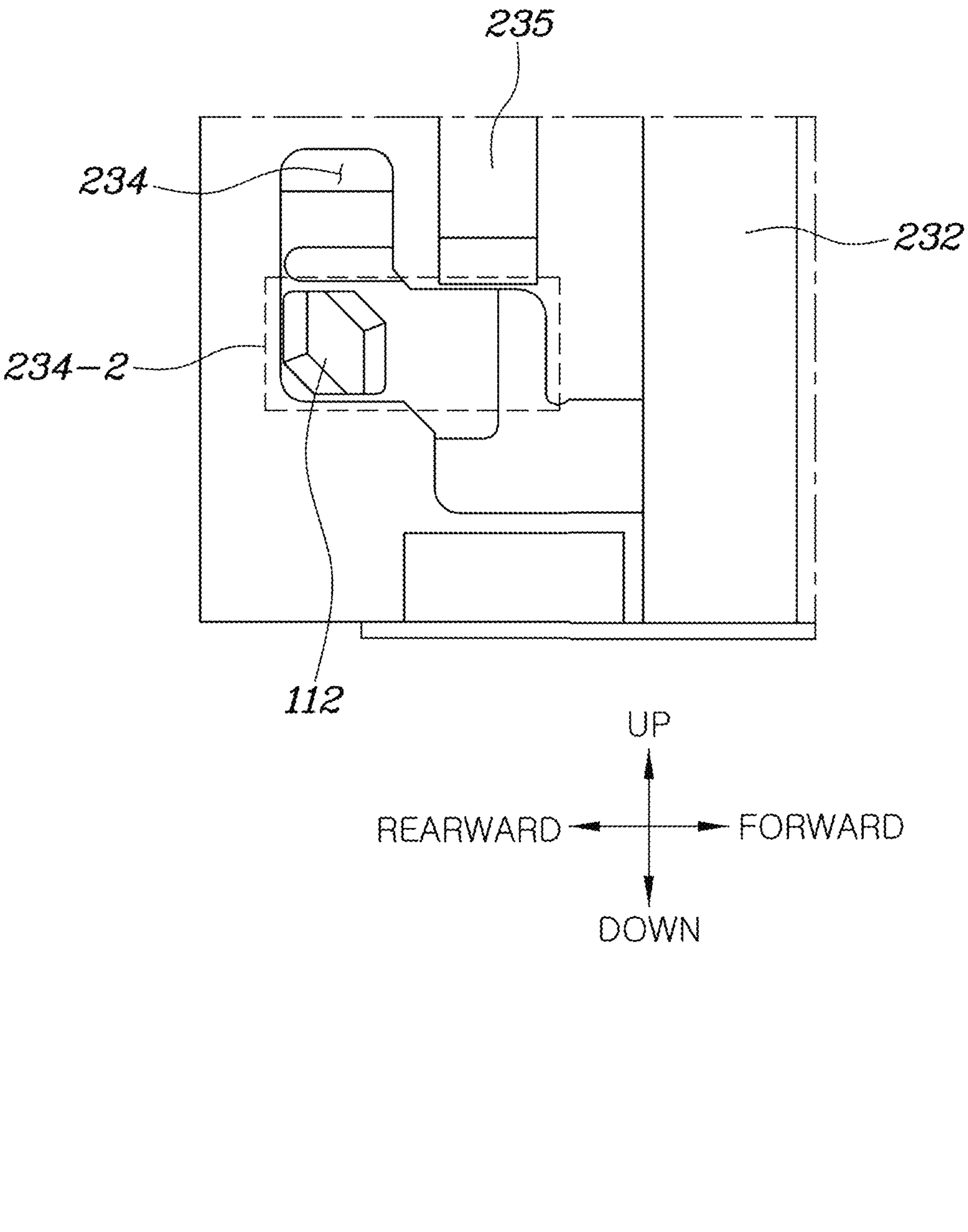
Figure 14:
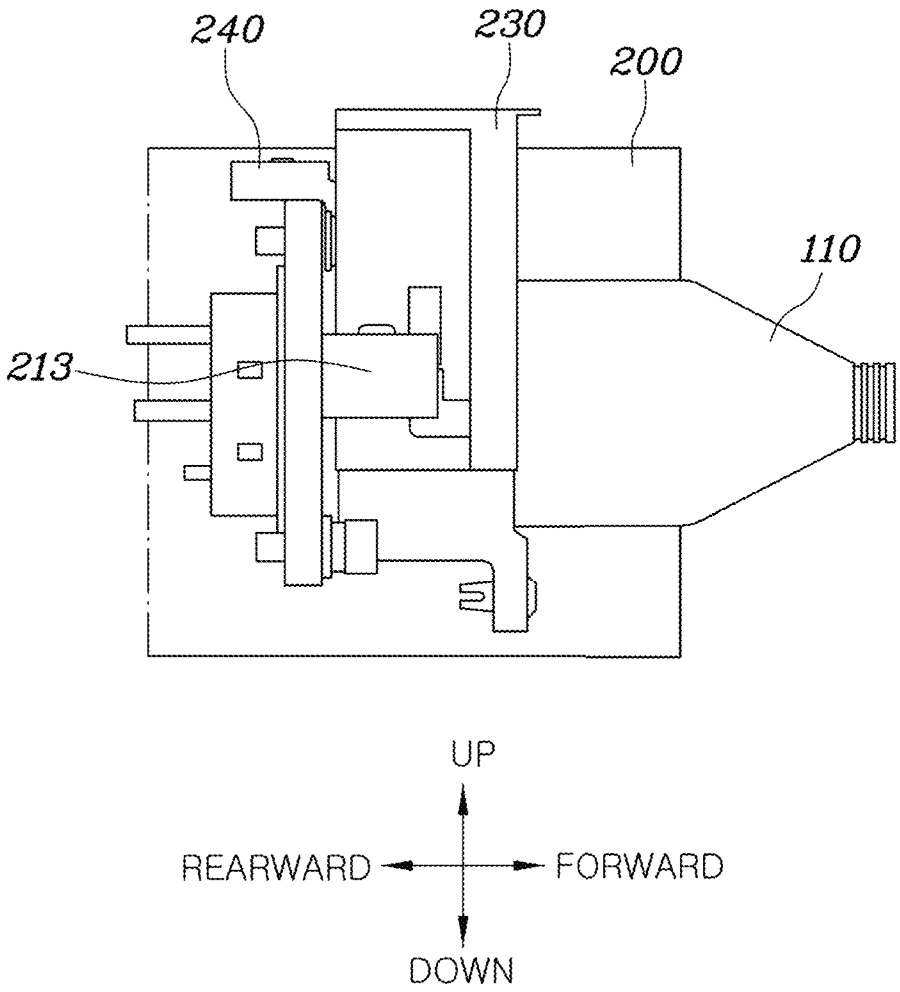

Referring to FIG. 13, when the protrusion 112 is positioned in the second section 234-2, the protrusion 112 can be moved rearward through the second section 234-2. As the protrusion 112 is moved rearward through the second section 234-2, the first connector 110 can be completely coupled to the second connector 210. FIG. 14 is a side view showing that the first connector 110 and the second connector 210 are completely coupled by moving the first connector 110. The first connector 110 and the second connector 210 are completely coupled but the retainer 230 is not completely inserted in the control box for charging 200, so the stopper 240 may not be moved forward.

Figure 15:
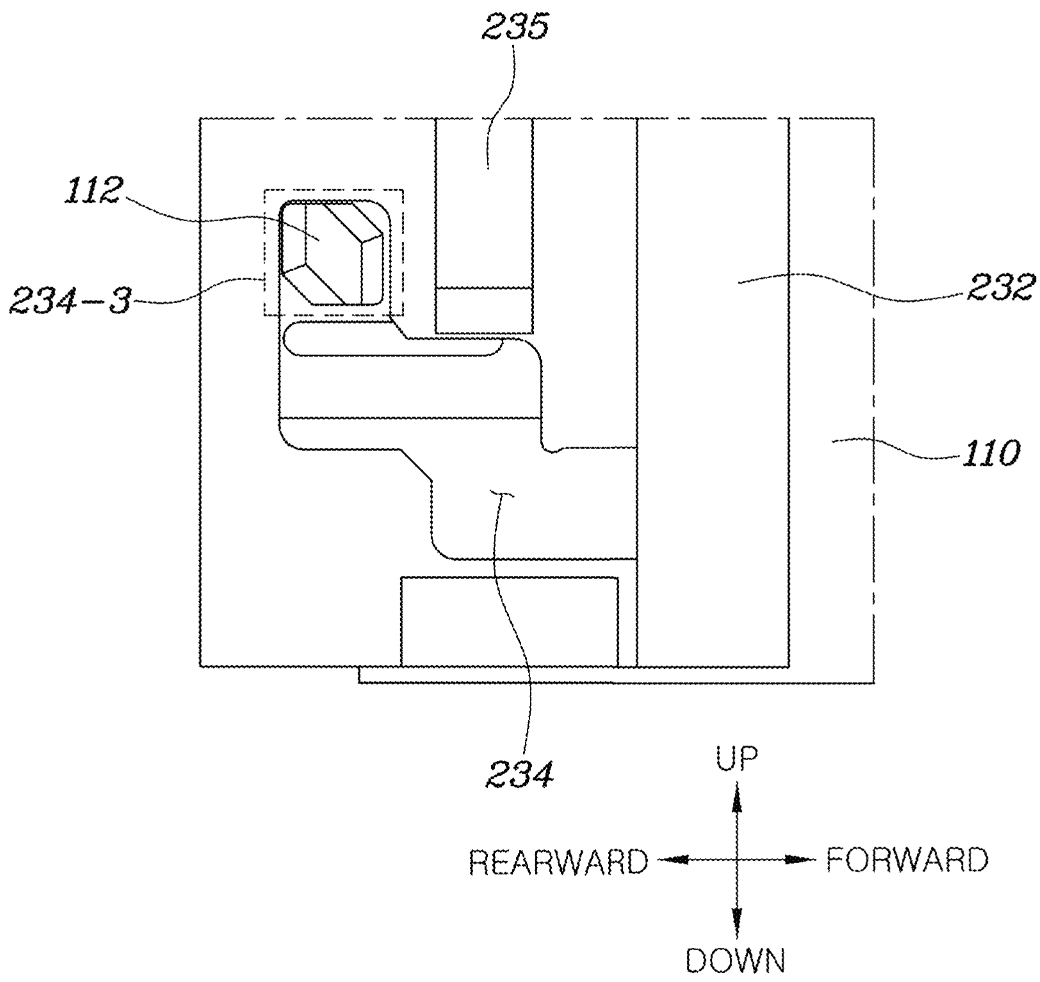

When the protrusion 112 remains in the second section 234-1 even though the first connector 110 and the second connector 210 are completely coupled, the protrusion 112 can be moved through the second section 234-1, so the first connector 110 and the second connector 210 may be decoupled into an incomplete coupling state. Accordingly, as shown in FIG. 13, when the protrusion 112 reaches the rear end of the second section 234-2, and the first connector 110 and the second connector 210 are completely coupled, it is possible to position the protrusion 112 in a third section 234-3 of the sections of the guide hole 234, as shown in FIG. 15, by moving down the retainer 230. When the protrusion 112 is positioned in the third section 234-3, as shown in FIG. 15, front-rear movement of the protrusion 112 is restricted, whereby it is possible to prevent separation of the first connector 110 due to an external force after the first connector 110 and the second connector 210 are completely coupled.

Figure 16:
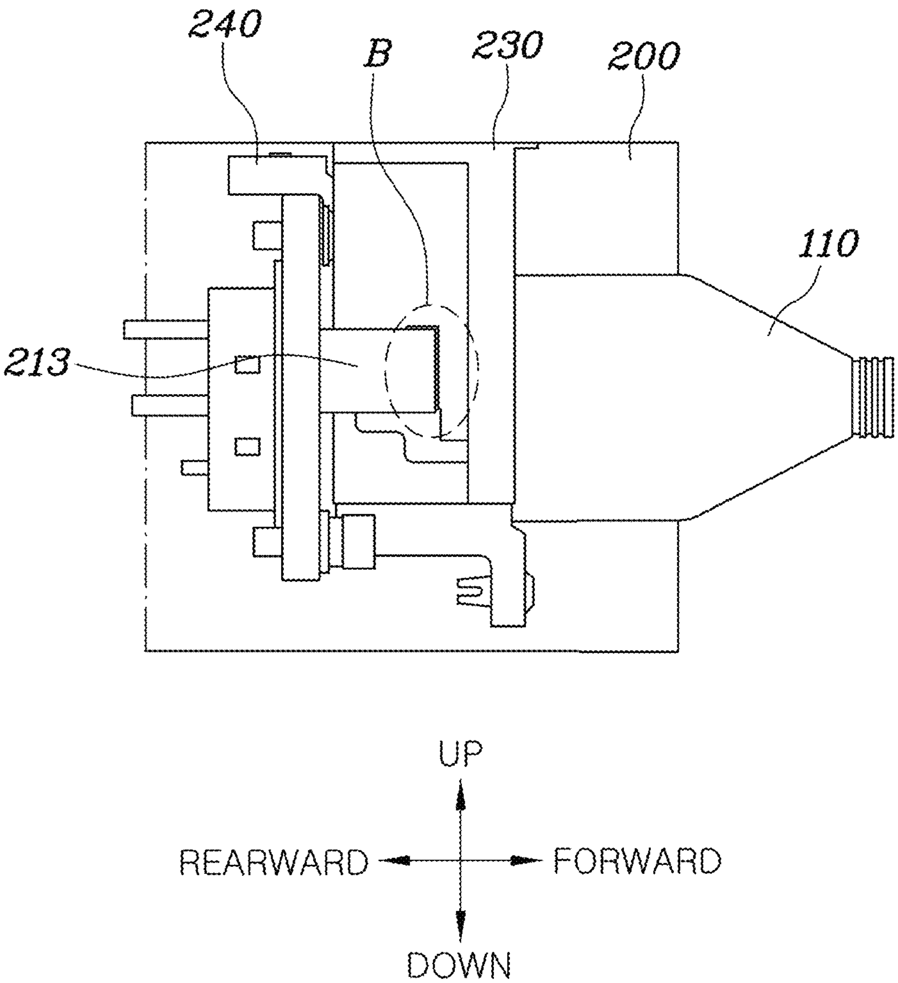

Referring to FIG. 16, when the first connector 110 and the second connector 210 are completely coupled and the retainer 230 is completely inserted in the control box for charging 200, the stopper 240 is moved forward, thereby being able to restrict up-down, i.e., vertical movement of the retainer 230. Accordingly, when the first connector 110 and the second connector 210 are completely coupled, it is possible to maintain the coupling state of the first connector 110 and the second connector 210 due to the existence of the retainer 230 and the stopper 240 according to an embodiment of the present disclosure and the shape of the retainer 230. Further, since up-down, i.e., vertical movement and front-rear movement of the first connector 110 are restricted, it is possible to prevent the first connector 110 from separating from the second connector 210 even though an external force is applied.

Further, it is possible to maintain the coupling state of the first connector 110 and the second connector 210 using the holders 213 according to an embodiment of the present disclosure. For example, the holder 213 is fitted in a fixing groove 235 formed at the leg 232 of the retainer 23 at part B shown in FIG. 16, thereby restricting up-down, i.e., vertical movement of the retainer 230. Accordingly, it is possible to maintain the coupling state of the first connector 110 and the second connector 210. This is described with reference to FIG. 17.

Figure 17:
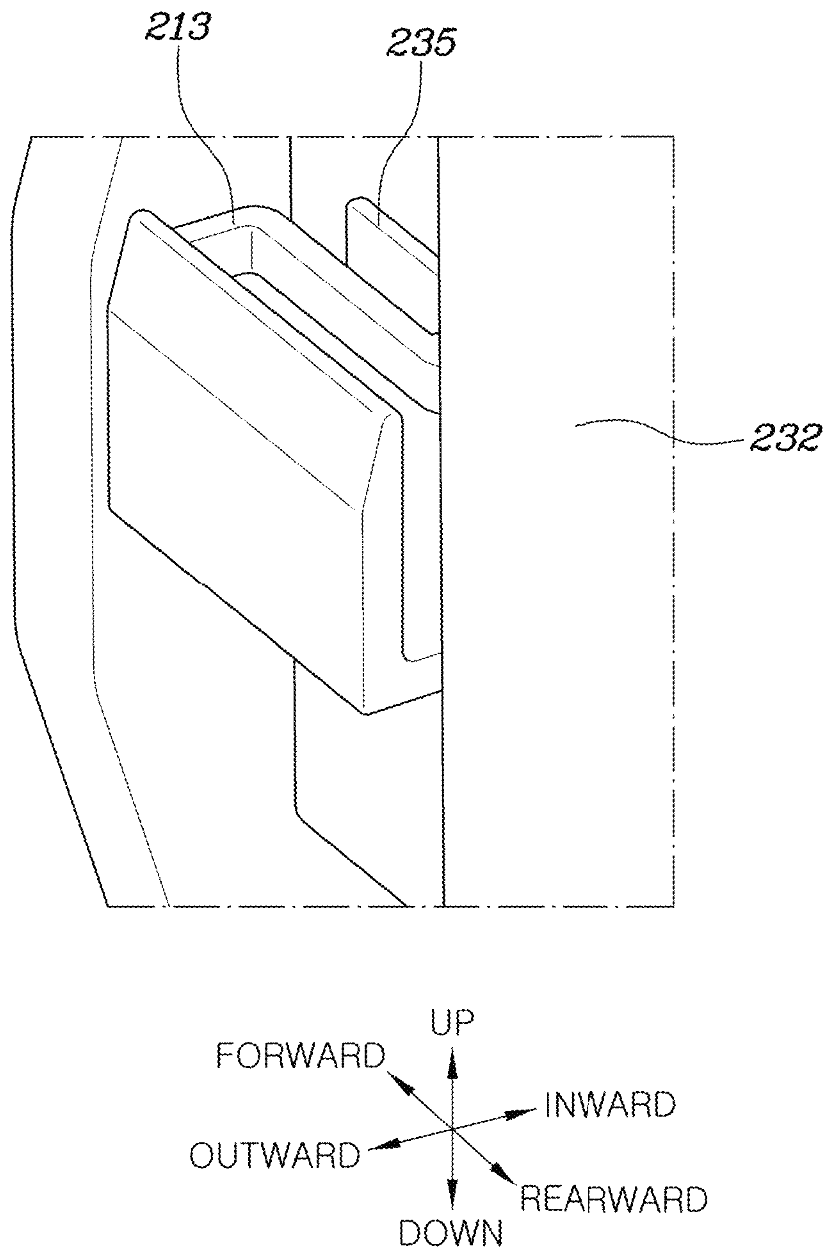
FIG. 17 is an enlarged view of part B shown in FIG. 16 according to an embodiment of the present disclosure.

FIG. 17 is an enlarged view of part B shown in FIG. 16 according to an embodiment of the present disclosure.

Referring to FIG. 17, when the first connector 110 and the second connector 210 are coupled, the holder 213 is moved outward by the protrusion 112 formed on the first connector 110 and is maintained the outwardly moved position, whereby the first connector 110 and the second connector 210 can be coupled. When the protrusion 112 is moved into the third section 234-3 of the guide hole 234 as the first connector 110 and the second connector 210 are completely coupled, the outwardly moved portion of the holder 213 is moved back inward, so the original state can be maintained. Since the holder 213 is moved inward and maintained in the original state, the holder 213 can be inserted in the fixing groove 235 formed at the leg 232 of the retainer 230.

The retainer 230 being completely inserted in the control box for charging 200 due to complete coupling of the first connector 110 and the second connector 210 can be primarily restricted in up-down movement by the stopper 240 and can also be secondarily restricted in up-down movement by the holder 213 inserted in the fixing groove 235 of the leg 232 of the retainer 230.

Accordingly, since the retainer 230 that can maintain a coupling state when the first connector 110 and the second connector 210 are coupled is provided, it is possible to prevent the first connector 110 and the second connector 210 from being forcibly decoupled by an external force and it is possible to improve safety for a user in charging.

Although the present disclosure has been provided above in relation to specific embodiments shown in the drawings, it should be apparent to those having ordinary skill in the art that the embodiments of the present disclosure may be changed and modified in various ways without departing from the scope of the present disclosure, which is described in the following claims.

The present disclosure can be achieved as computer-readable codes in a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

What is claimed is:

1. A control box for charging, the control box comprising:

a first connector provided at a first end of a supply cable configured to be connected to an external power source;

a second connector disposed at a first end of the control box for charging and configured to be coupled to the first connector; and a controller configured to monitor or control a state-of-charge (SOC) in a vehicle, depending on whether the first connector and the second connector are completely coupled, wherein the second connector includes a plurality of terminals in which a plurality of connection pins provided at the first connector are inserted, respectively, and at least some of which are different in length, and wherein the controller determines whether the first connector and the second connector are completely coupled based on whether the terminals, at least some of which are different in length, and the plurality of connection pins are in contact with each other.

2. The control box of claim 1, wherein an output cable configured to provide power from the external power source to the vehicle is always connected to a second end of the control box for charging.

3. The control box of claim 1, wherein the plurality of terminals includes:

an alternating current (AC) terminal to which AC power is input; and a signal terminal configured to transmit a power input signal or a communication signal, wherein a protruding length of the AC terminal is longer than a protruding length of the signal terminal.

4. The control box of claim 3, wherein the controller determines complete coupling only when the AC terminal and the signal terminal are all in contact with the plurality of connection pins.

5. The control box of claim 4, wherein the controller determines whether the AC terminal and the signal terminal are all in contact with the plurality of connection pins based on voltages at the AC terminal and the signal terminals.

6. The control box of claim 1, wherein the controller determines an incomplete coupling state and outputs determination information when the first connector and the second connector are not completely coupled.

7. A control box for charging, the control box comprising:

a first connector provided at a first end of a supply cable configured to be connected to an external power source;

a second connector disposed at a first end of the control box for charging and configured to be coupled to the first connector; and a retainer configured to prevent separation of the first connector when the first connector and the second connector are completely coupled, wherein a top of the control box is open at a position corresponding to the second connector, wherein the retainer is inserted through the open top and moved up and down, and wherein the second connector includes holders configured to fix a position of the retainer when the first connector is not coupled to the second connector.

8. The control box of claim 7, further comprising a stopper configured to prevent up-down movement of the retainer when the first connector and the second connector are completely coupled.

9. The control box of claim 8, wherein the stopper has a spring therein and is moved forward by the spring and coupled to the retainer when the first connector and the second connector are completely coupled, thereby preventing up-down movement of the retainer.

10. The control box of claim 7, wherein the retainer includes:

a cover configured to cover the open top when the first connector and the second connector are completely coupled; and legs extending downward from ends of both sides of the cover and having respective guide holes in which the first connector is moved and fixed when the first connector and the second connector are coupled.

11. The control box of claim 10, wherein the cover has an internal space open rearward, and wherein a stopper configured to prevent up-down movement of the retainer is inserted in the internal space when the first connector and the second connector are completely coupled.

12. The control box of claim 10, wherein the holders are configured to fix the position of the retainer by being inserted in the guide holes.

13. The control box of claim 12, wherein the holders are formed to be spaced apart from the sides of the second connector, and wherein the legs are positioned between the holders and the sides of the second connector.

14. The control box of claim 12, wherein protrusions are formed on an outer surface of the first connector, and wherein the protrusions are inserted in and moved through the guide holes and release the retainer by moving outward the holders inserted in the guide holes.

15. The control box of claim 14, wherein the holders moved outward are inserted in fixing grooves formed at the legs of the retainer when the protrusions finish being moved and the first connector and the second connector are completely coupled, thereby fixing the retainer.

16. The control box of claim 10, wherein protrusions are formed on an outer surface of the first connector and are inserted in and moved through the guide holes divided into a plurality of sections, whereby the first connector and the second connector are completely coupled.

17. The control box of claim 16, wherein the first connector is primarily coupled to the second connector when the protrusions are moved rearward through a first section of the plurality of sections of the guide holes and is completely coupled to the second connector when the protrusions are moved rearward through a second section of the plurality of sections.

18. The control box of claim 17, wherein:

when the protrusions reach a rear end of the first section, the retainer is moved down so that the protrusions are positioned in a second section of the plurality of sections;

when the protrusions reach a rear end of the second section, the retainer is moved down so that the protrusions are positioned in a third section of the plurality of sections; and the retainer restricts forward-rearward movement of the protrusions in the third section, thereby preventing separation of the first connector.

* * * * *